United States Patent
Esders et al.

(10) Patent No.: US 12,030,285 B2
(45) Date of Patent: Jul. 9, 2024

(54) DECORATIVE FUNCTIONAL COMPONENT HAVING A TRANSPARENT PARTIAL SURFACE

(71) Applicant: KOSTAL Automobil Elektrik GmbH & Co. KG, Luedenscheid (DE)

(72) Inventors: Berthold Esders, Schalksmuehle (DE); Matthias Thiel, Luedenscheid (DE); Thorsten Puehl, Nachrodt-Wiblingwerde (DE)

(73) Assignee: KOSTAL Automobil Elektrik GmbH & Co. KG, Luedenscheid (DE)

( * ) Notice: Subject to any disclaimer, the term of this patent is extended or adjusted under 35 U.S.C. 154(b) by 351 days.

(21) Appl. No.: 17/691,279

(22) Filed: Mar. 10, 2022

(65) Prior Publication Data

US 2022/0194065 A1    Jun. 23, 2022

Related U.S. Application Data

(63) Continuation of application No. PCT/EP2020/085911, filed on Dec. 14, 2020.

(30) Foreign Application Priority Data

Dec. 18, 2019   (DE) .................. 10 2019 008 780.1

(51) Int. Cl.
*B32B 3/00* (2006.01)
*B29C 45/14* (2006.01)
(Continued)

(52) U.S. Cl.
CPC ........ *B32B 27/08* (2013.01); *B29C 45/14336* (2013.01); *B32B 3/04* (2013.01);
(Continued)

(58) Field of Classification Search
None
See application file for complete search history.

(56) References Cited

U.S. PATENT DOCUMENTS

| | | |
|---|---|---|
| 5,556,584 A | 9/1996 | Yamazaki et al. |
| 5,560,706 A | 10/1996 | Yamazaki et al. |

(Continued)

FOREIGN PATENT DOCUMENTS

| | | |
|---|---|---|
| DE | 3726225 C1 | 8/1988 |
| DE | 4341292 A1 | 6/1994 |

(Continued)

OTHER PUBLICATIONS

European Patent Office, International Search Report for International Application No. PCT/EP2020/085911, dated Mar. 24, 2021.

(Continued)

*Primary Examiner* — Alexander S Thomas
(74) *Attorney, Agent, or Firm* — Brooks Kushman P.C.

(57) ABSTRACT

A decorative functional component with a transparent partial surface includes a substrate and a flat cover body. The substrate is of a first plastic material and has a recess. The cover body is of a transparent second plastic material and covers the recess of the substrate. The substrate and the cover body are connected together by a loose form-fit connection. The substrate and the cover body and are jointly coated with a low viscosity curing transparent plastic flooded thereon.

10 Claims, 4 Drawing Sheets

(51) Int. Cl.
  *B32B 3/04* (2006.01)
  *B32B 27/08* (2006.01)
  *B32B 27/40* (2006.01)
  *B29K 75/00* (2006.01)
  *B29L 31/34* (2006.01)

(52) U.S. Cl.
  CPC .......... *B32B 27/40* (2013.01); *B29K 2075/00* (2013.01); *B29K 2995/0026* (2013.01); *B29L 2031/3475* (2013.01); *B32B 2307/412* (2013.01); *B32B 2457/20* (2013.01); *Y10T 428/24017* (2015.01)

(56) References Cited

U.S. PATENT DOCUMENTS

| | | | |
|---|---|---|---|
| 5,852,854 | A | 12/1998 | Pierrot et al. |
| 2007/0114939 | A1 | 5/2007 | Joseph et al. |
| 2008/0087080 | A1 | 4/2008 | Gwosdz et al. |
| 2013/0153128 | A1 | 6/2013 | Krogdahl et al. |

FOREIGN PATENT DOCUMENTS

| | | |
|---|---|---|
| DE | 69600896 T2 | 6/1999 |
| DE | 102006048550 A1 | 4/2008 |
| DE | 102013212445 A1 | 12/2014 |

OTHER PUBLICATIONS

German Patent and Trademark Office, German Search Report for corresponding German Patent Application No. 10 2019 008 780.1 dated Aug. 26, 2020.

The International Bureau of WIPO, PCT Written Opinion of the International Searching Authority for International Application No. PCT/EP2020/085911 mailed Mar. 24, 2021.

The State Intellectual Property Office of People's Republic of China, Chinese First Office Action for Chinese Patent Application No. 202080069990.8 issued Jan. 10, 2024.

The State Intellectual Property Office of People's Republic of China, First China Search Report for Chinese Patent Application No. 202080069990.8 dated Dec. 14, 2020.

DECORATIVE FUNCTIONAL COMPONENT HAVING A TRANSPARENT PARTIAL SURFACE

CROSS-REFERENCE TO RELATED APPLICATIONS

This application is a continuation of International Application No. PCT/2020/085911, published in German, with an international filing date of Dec. 14, 2020, which claims priority to DE 10 2019 008 780.1, filed Dec. 18, 2019, the disclosures of which are incorporated in their entirety by reference herein.

TECHNICAL FIELD

The present invention relates to a decorative functional component with a transparent partial surface, the decorative functional component including a plastic substrate and a flat cover body, the plastic substrate being made of a first plastic material and having a recess, and the cover body being made of a transparent second plastic material and covering or filling the recess of the plastic substrate.

BACKGROUND

Components that are manufactured as two-component, injection-molded parts are known that acquire a transparent partial area or a completely transparent molded part, possibly back-molded behind a decorative film, which in a further step is partially or fully back-molded. These components contain high mechanical stresses.

A functional component having a viewing window in a housing is known from German Patent application DE 10 2006 048 550 A1. The housing and viewing window are designed as a two-component injection-molded part, with adjoining edges of the housing and the viewing window having a tongue and groove joint.

It is preferably provided that the plastic material of the viewing window is slightly melted in the area of the tongue and groove joint and forms a tight material bond with the material of the housing. Such a tight material bond is advantageous when the viewing window in particular is to be framed into the housing in a liquid-tight manner. However, mechanical tensions that influence the optical properties of the viewing window are unavoidable.

This is disadvantageous in particular when the viewing window is to be situated in front of a display whose appearance may thus be impaired.

In addition, for many applications it is undesirable for a viewing window to be discernible as a particular or special area of a functional component.

SUMMARY

An object is to provide a generic functional component in a simple manner while largely avoiding the disadvantages stated above.

In embodiments of the present invention, a decorative functional component with a transparent partial surface includes a plastic substrate (or plastic carrier) and a flat cover body. The plastic substrate is made of a first plastic material and the cover body is made of a transparent second plastic material. The plastic substrate has a recess. The cover body covers or fills the recess of the plastic substrate. The plastic substrate and the cover body are joined by a loose form-fit and are jointly coated, by flooding, with a low viscosity curing transparent plastic.

Embodiments of the present invention achieve the above object and/or other objects in that the plastic substrate and the cover body are joined together by a loose form-fit connection and are jointly coated with a low viscosity, curing (or hardening), transparent plastic by flooding.

A "loose form-fit connection" is understood to mean a form-fit arrangement of components whose mechanical connection is intentionally designed with play.

Embodiments of the present invention thus provide, firstly, to mechanically decouple the two joined components (i.e., the plastic substrate and the cover body) in order to prevent mechanical stresses, and secondly, to overmold these two joined components in a further step using a transparent elastic compound, preferably a polyurethane, in order to form or cover the surface of the functional component in such a way that the separate arrangement of the two components is optically concealed. The transparent plastic layer that adheres to both the plastic substrate and the cover body also affixes these two components to one another without thereby building up mechanical stresses between them.

BRIEF DESCRIPTION OF THE DRAWINGS

Exemplary embodiments of decorative functional components in accordance with the present invention are illustrated and explained in greater detail below with reference to the drawings, which include the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
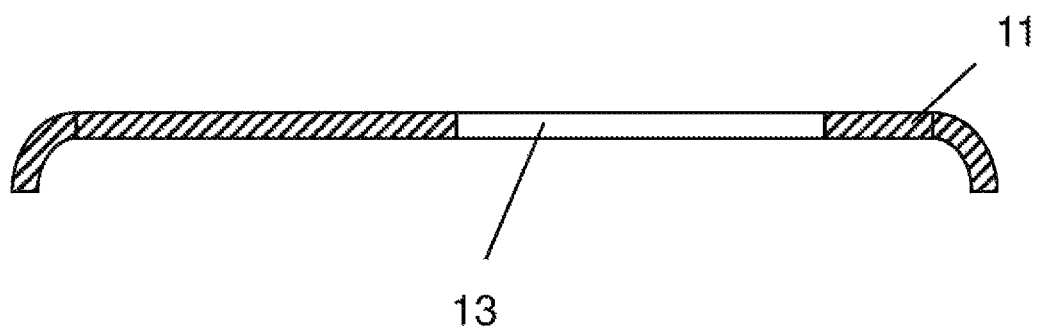
FIG. 1 illustrates a plastic substrate of a decorative functional component in accordance with a first exemplary embodiment.

Referring now to FIG. 1, FIGS. 2a and 2b, and FIGS. 3a, 3b, and 3c, a decorative functional component in accordance with a first exemplary embodiment will be described. The decorative functional component includes a plastic substrate (or plastic carrier) 11. FIG. 1 illustrates plastic substrate 11 in cross-section. As shown in FIG. 1, plastic substrate 11 includes a recess 13. Plastic substrate 11 is injection-molded from a first plastic material. Plastic substrate 11, illustrated schematically, may be part of a housing or an operator panel.

Figure 2A:
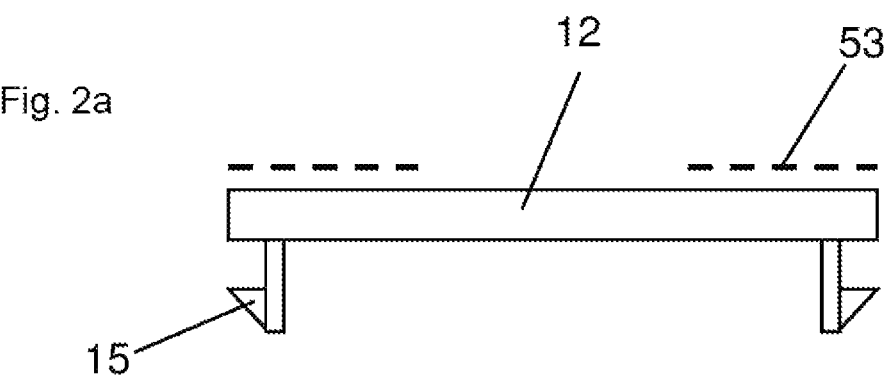
FIGS. 2a and 2b illustrate two design variants of a cover body of the decorative functional component in accordance with the first exemplary embodiment.
Figure 2B:
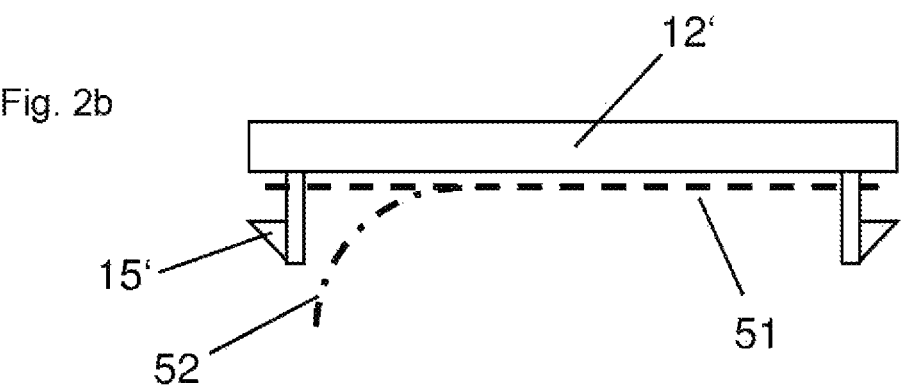

The decorative functional component further includes a cover body 12. FIG. 2a illustrates a first design variant of cover body 12 and FIG. 2b illustrates a second design variant of cover body 12'. Cover body 12, 12' is transparent. Particularly, cover body 12, 12' is either fully transparent, semi-transparent, or partially transparent. Like plastic substrate 11, cover body 12, 12' is also manufactured by injection molding. However, cover body 12, 12' is injection-molded from a second plastic material different than the first plastic material.

As shown in FIGS. 2a and 2b, cover body 12, 12' has clip hooks 15, 15'. Clip hooks 15, 15' allow a loose form-fit connection of cover body 12, 12' to plastic substrate 11. The outer spacing of clip hooks 15, 15' intentionally has a smaller design than the associated cross section of recess 13 of plastic substrate 11, so that after being clipped in, cover body 12, 12' is situated at plastic substrate 11 with play and free of mechanical stresses.

Cover body 12, 12' may already be provided with printing 53 prior to the mounting. Design print, color print, and also functional electrically conductive print may be imprinted on the top side or bottom side of cover body 12, 12'. The cover body may be manufactured either in one piece (FIG. 2a) or as an overmolded or back-molded film (FIG. 2b). The film may in particular be a functional film 51 having electrical sensors or display elements (not shown). It is indicated that functional film 51 has an electrical connection 52.

Figure 3A:
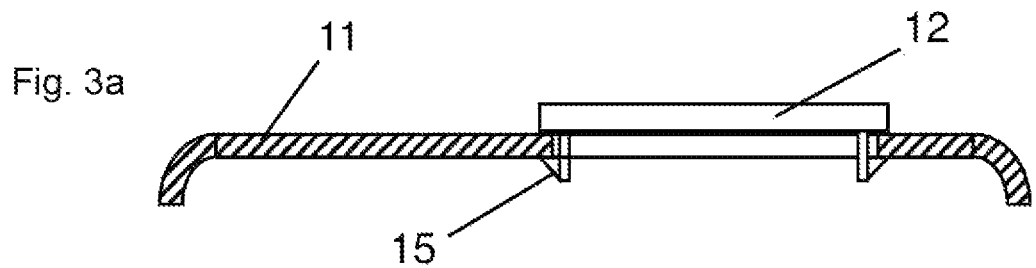
FIGS. 3a, 3b, and 3c respectively illustrate first, second, and third mounting steps for producing the decorative functional component in accordance with the first exemplary embodiment.
Figure 3B:
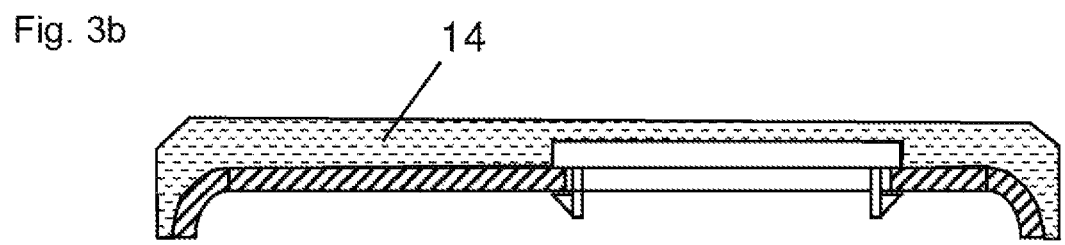
Figure 3C:
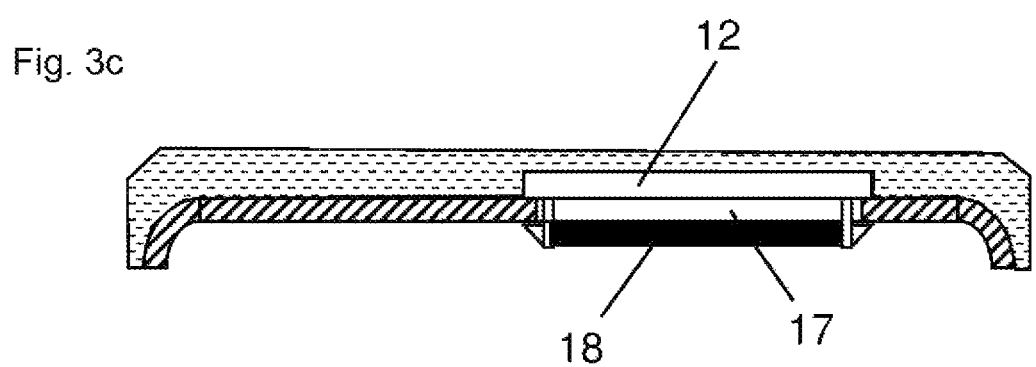

FIGS. 3a, 3b, and 3c respectively illustrate first, second, and third mounting steps for producing the decorative functional component in accordance with the first exemplary embodiment. Cover body 12 illustrated in FIGS. 3a, 3b, and 3c is provided to form a transparent window within plastic substrate 11. For this purpose, cover body 12 is clipped with its clip hooks 15 into recess 13 of plastic substrate 11, per the first mounting step shown in FIG. 3a. The joined components (i.e., cover body 12 joined to plastic substrate 11) are subsequently jointly flooded using a transparent low-viscosity liquid that cures to form a transparent plastic layer 14, per the second mounting step shown in FIG. 3b. A polyurethane is preferably provided as flooding material.

When the first plastic material of plastic substrate 11 and/or the second plastic material of cover body 12 does not adhere to the low viscosity liquid (or does not take up any flattening to the low viscosity liquid), the surfaces of plastic substrate 11 and of cover body 12 may advantageously be provided with an adhesion promoter beforehand.

The window created by cover body 12 within plastic substrate 11 is preferably provided to allow a view of a display or some other display element, which in particular may be an integral part of the functional component.

For the further building or construction of such a functional component, a display 18 is mounted to the rear side of cover body 12, per the third mounting step shown in FIG. 3c. Display 18 is mounted to the rear side of cover body 12, for example, with the aid of an optical adhesive 17. This third mounting step may be omitted when cover body 12', as shown in FIG. 2b, already has a functional film 51 with one or more display elements.

Referring now to FIGS. 4a, 4b, 4c, and 4d, a decorative functional component in accordance with a second exemplary embodiment will be described. FIGS. 4a, 4b, 4c, and 4d respectively illustrate first, second, third, and fourth mounting steps for producing the decorative functional component in accordance with the second exemplary embodiment.

The decorative functional component in accordance with the second exemplary embodiment includes a plastic substrate 21, a cover body 22, and a transparent plastic layer 24.

Plastic substrate 21 includes a recess 23 and is of a first plastic material. Plastic substrate 21 having recess 23 is manufactured by injection molding, per the first mounting step shown in FIG. 4a. In addition, the inner edge of recess 23 here has a molded-on circumferential ridge 26.

In the following second mounting step shown in FIG. 4b, recess 23 in an injection mold is filled with a transparent second plastic material. After curing, the second plastic material forms a cover body 22 that fills up recess 23. The second plastic material is chemically different from the first plastic material of plastic substrate 21 and is selected in such a way that the two plastic materials are not able to form an integrally bonded connection. As such, the two plastic materials cannot form a material bond with one another.

Figure 4A:
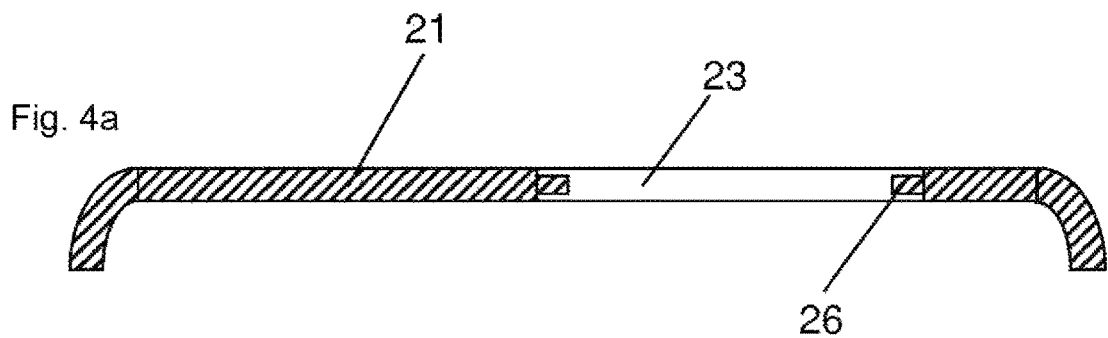
FIGS. 4a, 4b, 4c, and 4d respectively illustrate first, second, third, and fourth mounting steps for producing a decorative functional component in accordance with a second exemplary embodiment.
Figure 4B:
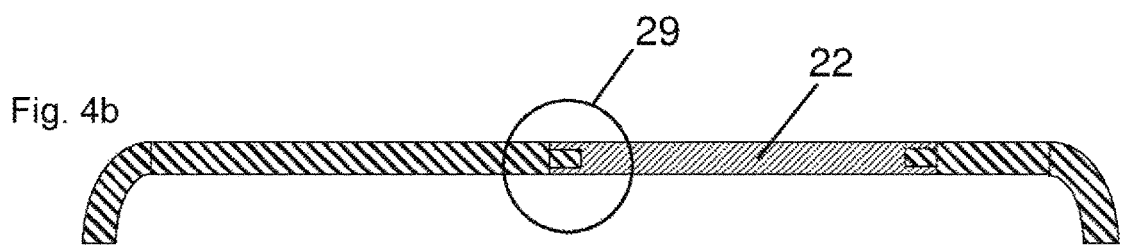
Figure 4C:
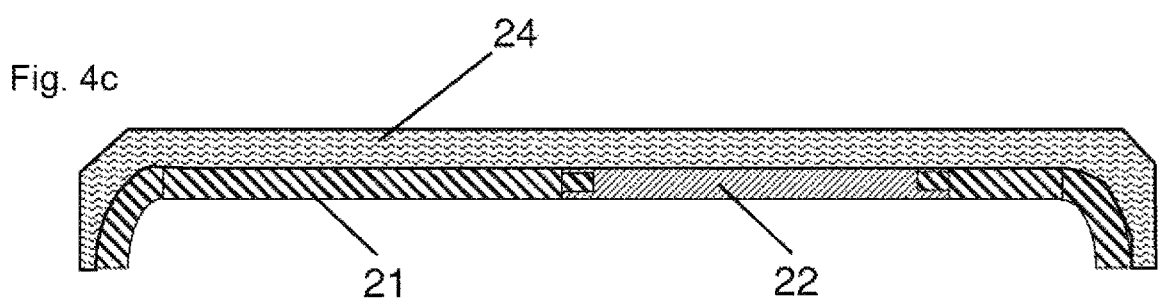
Figure 4D:
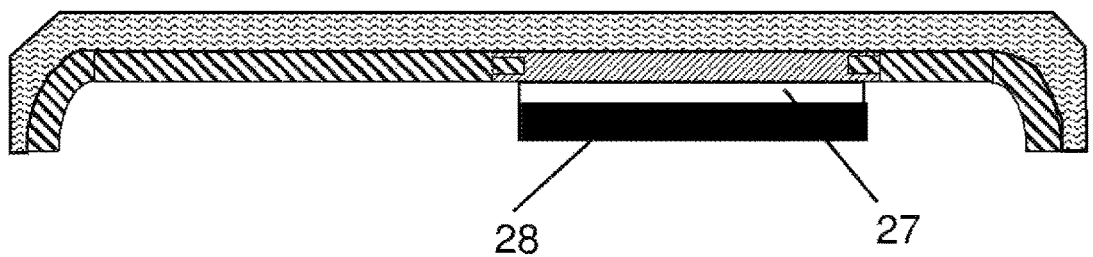

The overmolded circumferential ridge 26 thus forms a true form-fitting tongue and groove joint or connection 29 between plastic substrate 21 and cover body 22, shown in FIGS. 4b, 4c, and 4d, without their plastic materials forming a fixed connection to one another. A loose form-fit connection may thus be achieved in which cover body 22 is stable, but at the same time is seated within recess 23 of plastic substrate 21 with play and free of stress.

In the following third mounting step shown in FIG. 4c, plastic substrate 21 and cover body 22 are flooded using a low viscosity liquid which subsequently cures to form transparent plastic layer 24. Plastic layer 24 stabilizes the arrangement of cover body 22 on plastic substrate 21. Consequently, cover body 22, despite the loose, stress-free connection, can no longer be displaced or shifted relative to plastic substrate 21. At the same time, plastic layer 24 optically conceals the multipart design of the surface underneath.

In the following fourth mounting step shown in FIG. 4d, mounting a display 28 at the bottom side of cover body 22 by use of an optical adhesive 27 is optionally available.

Figure 5:
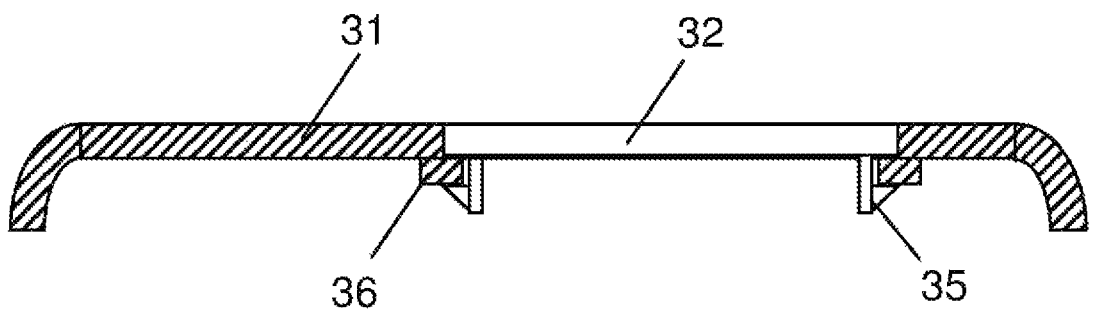
FIG. 5 illustrates a decorative functional component in accordance with a third exemplary embodiment.

Referring now to FIG. 5, a decorative functional component in accordance with a third exemplary embodiment will be described. The decorative functional component in accordance with the third exemplary embodiment includes a plastic substrate 31, a cover body 32, and a transparent plastic layer (not shown in FIG. 5).

The decorative functional component in accordance with the third exemplary embodiment is a variant of the decorative functional component in accordance with the first exemplary embodiment shown in FIGS. 3a, 3b, and 3c in that plastic substrate 31 has a plane offset. In this regard, plastic substrate 31 at the edge of its recess (not numbered in FIG. 5) forms a circumferential bent abutment ridge 36. Clip hooks 35 of cover body 32 snap on to bent abutment ridge 36. Bent abutment ridge 36 allows cover body 32 to be inserted into the recess of plastic substrate 31 in such a way that the surface of cover body 32 is in flush alignment with the surface of plastic substrate 31.

As a result, the plastic coating (not shown in FIG. 5) may have a very thin design compared to plastic layer 14 in the first exemplary embodiment, since in this case the plastic coating does not have to enclose a majority of the volume of cover body 32.

Figure 6A:
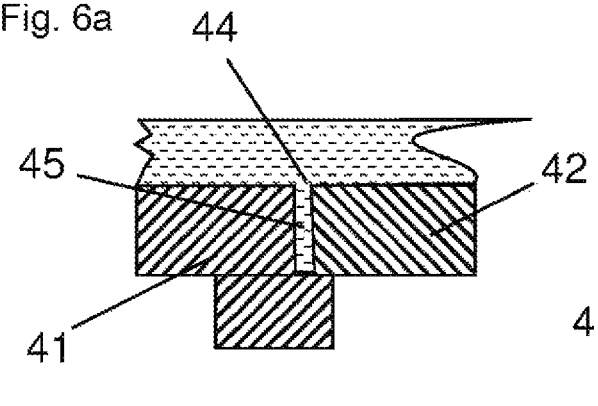
FIGS. 6a and 6b respectively illustrate design details of a decorative functional component in accordance with one or more of the exemplary embodiments.
Figure 6B:
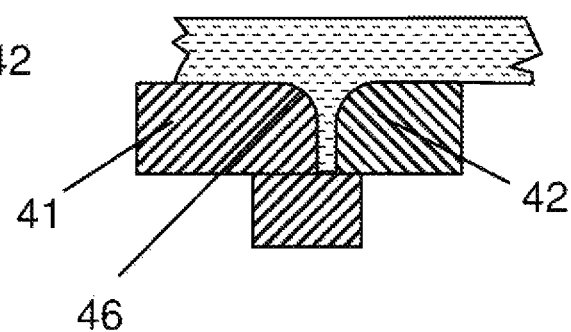

FIGS. 6a and 6b respectively illustrate design details of a decorative functional component in accordance with one or more of the exemplary embodiments. Particularly, FIGS. 6a and 6b show two examples of a possible design of the transition between a plastic substrate 41 and a cover body 42.

For functional components, for example narrow straight gaps 45 may be provided between plastic substrate 41 and cover body 42, as shown in FIG. 6a. For functional components with rounded edges, gaps with transition radii 46 may be provided as shown in FIG. 6b, which during the flooding operation are filled up by the low viscosity liquid. This low viscosity liquid after curing forms transparent plastic layer 44.

LIST OF REFERENCE NUMERALS 11, 21, 31, 41 plastic substrate (carrier)
12, 12', 22, 32, 42 cover body (covering body)
13, 23 recess
14, 24, 44 transparent plastic (layer)
15, 15', 35 clip hooks
17, 27 optical adhesive
18, 28 display
26 circumferential ridge (bar)
29 tongue and groove joint (connection)
36 bent circumferential abutment ridge (bar)
45 straight gap (slit)
46 gaps with transition radii
51 functional film (foil)
52 electrical connection
53 printing While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A decorative functional component with a transparent partial surface, comprising:
    a substrate of a first plastic material and that has a recess;
    a flat cover body of a transparent second plastic material, the cover body covering the recess of the substrate;
    wherein the substrate and the cover body are connected together by a loose form-fit connection; and
    the substrate and the cover body and are jointly coated with a low viscosity curing transparent plastic flooded thereon.

2. The decorative functional component of claim 1 wherein:
    the cover body is offset from the substrate.

3. The decorative functional component of claim 1 wherein:
    the cover body includes clip hooks; and
    the loose form-fit connection between the substrate and the cover body is a detent connection established by the clip hooks being clipped to the recess of the substrate.

4. The decorative functional component of claim 1 wherein:
    the loose form-fit connection between the substrate and the cover body includes at least one tongue and groove connection between the substrate and the cover body.

5. The decorative functional component of claim 1 wherein:
    the first plastic material and the second plastic material do not form an integrally bonded connection with one another.

6. The decorative functional component of claim 1 wherein:
    a display is situated on a side of the cover body opposite to the recess of the substrate.

7. The decorative functional component of claim 1 wherein:
    the low viscosity curing transparent plastic is a polyurethane.

8. The decorative functional component of claim 1 wherein:
    the substrate is part of a housing.

9. The decorative functional component of claim 1 wherein:
    the substrate is part of a user panel.

10. The decorative functional component of claim 1 wherein:
    the cover body has printing printed thereon.

* * * * *